Aug. 1, 1939. C. COUTOR Re. 21,168
PROCESS AND APPARATUS FOR THE CONTINUOUS EXTRACTION OR TREATMENT OF LIQUIDS
Original Filed May 14, 1934 2 Sheets-Sheet 1
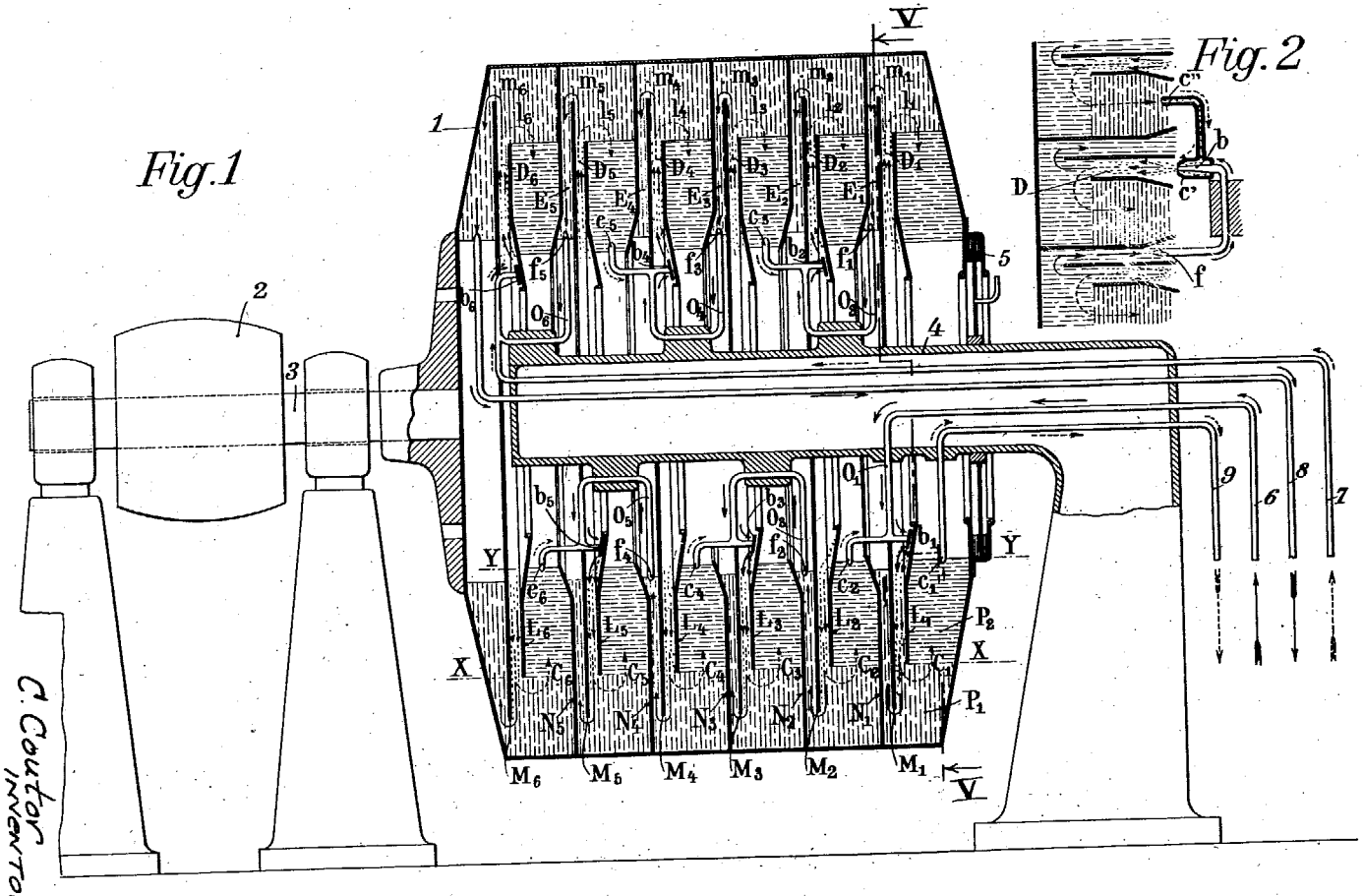
C. Coutor
INVENTOR
By: Marks & Clerk
Attys.

Aug. 1, 1939. C. COUTOR Re. 21,168

PROCESS AND APPARATUS FOR THE CONTINUOUS EXTRACTION OR TREATMENT OF LIQUIDS

Original Filed May 14, 1934 2 Sheets-Sheet 2

C. Coutor
INVENTOR

By: Glascock Downing & Seebold
Attys.

Reissued Aug. 1, 1939 Re. 21,168

UNITED STATES PATENT OFFICE 21,168

PROCESS AND APPARATUS FOR THE CONTINUOUS EXTRACTION OR TREATMENT OF LIQUIDS

Charles Coutor, Premery, France, assignor to Société Etablissements Lambiotte Freres, Premery (Nievre Department), France Original No. 2,036,924, dated April 7, 1936, Serial No. 725,630, May 14, 1934. Application for reissue March 17, 1938, Serial No. 196,576. In France May 19, 1933

18 Claims. (Cl. 196—45)

Figure 1A:
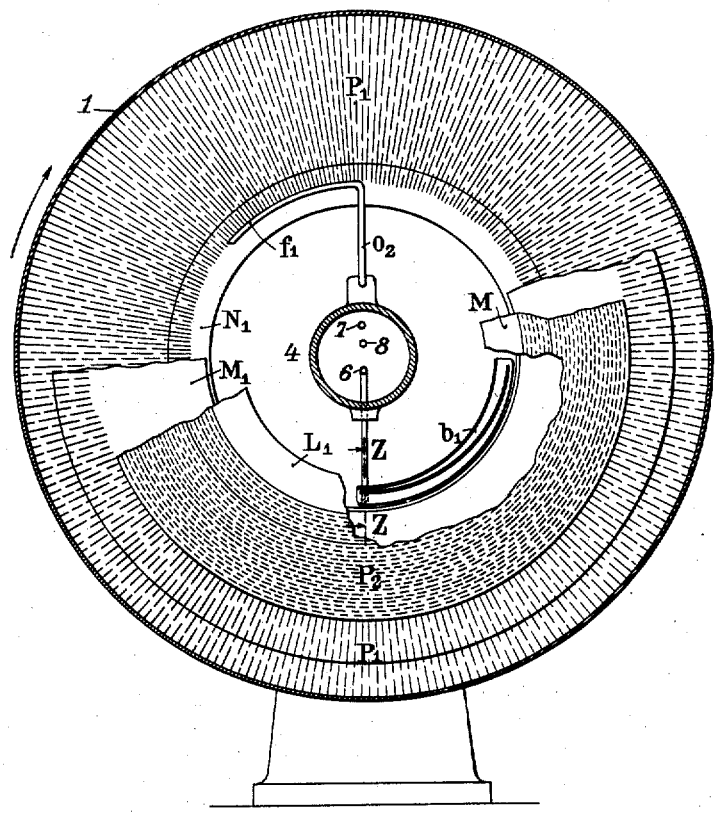

It is a common practice in industry to extract a definite body from a mixture constituting a liquid phase by a solvent or a reagent also liquid and non-miscible or incompletely miscible with the mixture under consideration.

For that purpose, use is generally made of columns of the counter-current type, with or without an inner lining, or a series of mixers provided with mechanical stirrers, followed by decanting apparatus; according to certain processes, the whole or a portion of the vapours of the solvent is used, in columns, for mixing or moving the liquids.

All these apparatus used have the inconvenience of being either of insufficient efficiency, or difficult to carry into practice, and are costly.

The present invention has for its object a process which makes it possible to effect, continuously, and by a single passage through a simple and compact apparatus, the methodical and complete extraction or treatment of a liquid by another liquid acting as solvent or reagent.

The process according to the invention is mainly characterized by the fact that the circulation and separation of the various products: mixture to be treated, solvent or reagent, intermediate and final products, are automatically ensured by centrifugal force, which is used, for that purpose, under the following conditions:

(*a*) The liquids are caused to circulate on the counter-current principle, for example, in a multi-stage apparatus, for ensuring a methodical and complete exhaustion of the mixture.

(*b*) Both liquids (solvent or reagent and mixture) are simultaneously caused to enter through fixed pipes, and they are simultaneously projected on conical walls rotating at a high speed.

(*c*) Preferably, use is made, concurrently with the movable walls, of fixed surfaces arranged very near the latter, so as to produce, by friction, a thorough stirring and intimate mixing of the liquids; this result can also be obtained by atomization, for instance, under the action of the available pressure of the liquids.

(*d*) The centrifugal force produces the separation of the emulsified mixture into concentric layers of different densities, viz.: into a layer comprising the solvent or reagent loaded with the body to be extracted, and into another layer formed by the empoverished mixture.

(*e*) The liquids of these various layers are separately drawn off by scoop-pipes similar to those of centrifugal apparatus of the so-called "cream separator" type, these scoop pipes conveying the various products as stated, that is to say on the counter-current principle and through several stages in which the above operations are repeated.

When these operations are terminated, the solvent or reagent and the body it has carried along are separated by any suitable process, for instance by distillation, or again by a treatment according to a process similar to that indicated above.

Of course, for carrying out the process the principle of which has just been set forth, it is possible to provide any suitable arrangements, capable of varying in the widest limits, according to the conditions of application (nature of the products to be treated, of the operations to be effected, etc.) without departing thereby from the scope of the invention.

The number and variety of the possible applications of this process are in fact very extensive: for instance, and without this enumeration being in any way limitative, there can be cited: the removal of tar from pyroligneous acids, removal of oil from methyl phlegms, purification of residual waters, extraction of acetic acid from its aqueous solutions, extraction of acetic acid from tars by washing with water, extraction of ethyl and methyl alcohols from their mixtures with ethers, separation of the anhydride-acetic acid mixture by petroleum, extraction of phenols, extraction of essential oils, acid or alkali treatments of petroleum on the counter-current principle, purification of oils and greases by oxidation or reduction, etc.

Likewise, any suitable plant can be devised for carrying this process into practice and especially any suitable modifications, considering the particular conditions of application, can be made in the dimensions of the apparatus, arrangement of the scoop-pipes, number of stages or of successive treatments, etc.

In certain cases it may be desirable or possible, considering the complexity of the mixture, to discern more than two concentric layers capable of being simultaneously separated; additional scoop-pipes and partitions can then be provided and suitably arranged.

Concerning that point, one may be led to draw off, in the form of sludge, a precipitate the density of which will be comprised between those of both liquids.

Likewise, it is possible to use as reagent a pulverulent product which practically behaves as a liquid in the various partitions of the apparatus, but, in this case, the scoop-pipes and mixing devices will of course be modified. This will be done when a liquid is treated by a carbon or decolouring earth, for instance.

Furthermore, use can be made, without departing from the invention, of a centrifugal apparatus rotating about an axis of orientation, the liquids can be introduced in said apparatus after previous cooling or reheating, and, consequently, the apparatus can be heat insulated or heated, the operation can be effected in presence of any gas, under vacuum or under pressure, etc.

By way of example, and in order that the invention may be more clearly understood, a form of construction of such an apparatus will be described hereinafter with reference to the accompanying drawings, this apparatus being adapted to be used for the extraction of a body dissolved in water, by means of a light solvent.

Figure 1B:
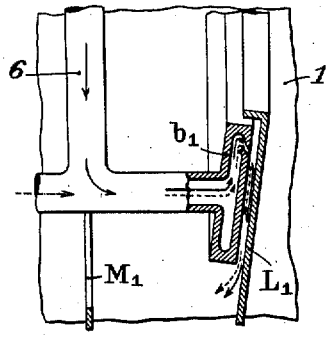

Fig. 1 is an axial vertical section of the entire apparatus.

Fig. 1[a] is a cross section made according to broken line V—V of Fig. 1.

Fig. 1[b] is a partial section, on an enlarged scale, made according to line Z—Z of Fig. 1[a].

Figure 2 is a similar partial view of a modification.

This apparatus comprises a turbine body 1, capable of receiving a rapid movement of rotation from a suitable motor (not shown), for instance through the medium of a transmission comprising a belt, a pulley 2 and a shaft 3.

This turbine rotates about a fixed hollow shaft 4 which passes through one end thereof, preferably through a hydraulic joint 5 ensuring fluid-tightness.

The shaft contains the inlet and outlet conduits for the products, viz.: a conduit 6 through which is admitted the mixture to be treated and a conduit 7 through which is admitted the solvent or reagent, a conduit 8 through which is discharged the exhausted mixture, and a conduit 9 through which is discharged the solvent or reagent loaded with the extracted product. The arrows in full lines indicate the mixture to be treated and the arrows in broken lines, the solvent or reagent.

The body 1 is divided into six juxtaposed compartments $C_1C_2 \ldots C_6$ by five annular partitions $N_1N_2 \ldots N_5$, and in each of these compartments are arranged two other annular partitions $L_1M_1$, $L_2M_2 \ldots L_6M_6$, respectively; the partitions $M_1$ to $M_6$ have an outer diameter smaller than the inner diameter of the body 1 and the partitions $L_1$ to $L_6$ have a diameter smaller than that of the partitions $M_1$ to $M_6$. These partitions are arranged as follows:

The partition $M_1 \ldots M_6$ (each partition bears indicia of the compartment to the left of which it is located in Fig. 1) is arranged at right angles to the axis of the turbine, so that a passageway $m_1 \ldots m_6$ is provided between its outer edge and the wall of the body 1.

To the right of the preceding partition $M_1 \ldots M_6$ is a partition $L_1 \ldots L_6$ having a central frustum-shaped portion and the outer edge of which is offset relatively to that of $M_1 \ldots M_6$, so as to provide a second peripheral passageway $l_1 \ldots l_6$.

Finally, to the left of each of the partitions $M_1 \ldots M_5$, is a third partition $N_1 \ldots N_5$ secured to the inner wall of the body 1.

Free narrow spaces $D_1 \ldots D_6$ exist between the partitions L, M and other narrow spaces $E_1 \ldots E_5$ are provided between the partitions M, N.

The decanting compartments alone are relatively large.

The circulation of the products takes place moreover through fixed tubes, arranged in the following manner:

The solution is led through the compartment $C_1 \ldots C_6$ from right to left on the drawings through scoop-pipes $f_1 \ldots f_5$ one end of which opens in the space comprised between the two partitions M, N and having an extension constituted by a conduit $O_2, O_3 \ldots O_6$ terminating in an annular jet $b_2 \ldots b_6$ opening very near the frustum-shaped portion of the corresponding wall $L_2 \ldots L_6$.

On the other hand, the solvent or reagent flows through the compartments $C_6 \ldots C_1$ from left to right on the drawings through scoop pipes $c_6$, $c_5$, $c_4$, $c_3$ which extend from the compartment bearing the same indicia and leads to the annular jet $b$ bearing a lower indicia.

The inlet ends of the scoop-pipes are so arranged that the liquids enter therein by inertia.

The conduit 6 through which is admitted the solution terminates in a conduit $O_1$ and an annular jet $b_1$ opening in proximity to the wall $L_1$ and to which leads the scoop-pipe $c_2$; the ends of these pipes extend through a relatively important arc of the circumference of the apparatus as diagrammatically indicated in Fig. 1*a*. The distance separating the fixed and movable surfaces is so adjusted as to ensure satisfactory emulsion of the solution and solvent.

The discharge conduit 9 for the extracted product is fed by a scoop-pipe $c_1$ opening in the compartment $C_1$.

The inlet conduit 7 for the solvent or reagent opens in the last annular jet $b_6$.

Finally, the discharge conduit 8 for the exhausted solution extends down, in the compartment $C_6$, beyond the last partition $L_6$.

The operation is as follows:

The solution to be treated, admitted through 6 and $O_1$, is projected by the jet $b_1$ on the frustum-shaped portion of the wall $L_1$, at the same time as the solvent or reagent which has already passed through the five compartments $C_6 \ldots C_2$ and is led to this jet $b_1$ by the scoop-pipe $c_2$.

Both liquids, intimately mixed, thus enter the mixing space or chamber $D_1$ in which the exhaustion of the solution begins.

These liquids are subjected to the action of centrifugal force and, owing to their difference of density and of their non-miscibility, they separate and form two concentric annular layers $P_1$, $P_2$, the outer layer $P_1$ being formed by the solution, which is the heavier, and the inner layer $P_2$ by the solvent.

The separating surface X—X of the two layers reaches, during the rotation, a level which depends on the radial distance separating the inlet ends of the scoop pipes $c_1$ and $f_1$, $c_2$ and $f_2$, etc., and on the density of the liquids treated, and this radial distance is so adjusted that in each compartment the said surface of separation XX is located at a distance from the axis of rotation at most equal to the radius of the respective disc $L_1$ or $L_2 \ldots$, and however large enough in order that the layer of solvent comprised between the level XX and the level YY of the inlet ends of the solvent scoop-pipes $c_1c_2 \ldots$, should have a sufficient thickness.

The solvent of the layer $P_2$ is drawn off through the scoop-pipe $c_1$ and discharged through the conduit 9, whilst the solution, passing through $m_1$ and $E_1$ is drawn off through the jet $f_1$ and sent, through $O_2$, $b_2$, into the compartment $C_2$, at the same time as the solvent coming from the compartment $C_3$ passes through the scoop-pipe $c_3$.

The exhaustion thus progressively proceeds in the various compartments through which pass, on the one hand, the solution and, on the other hand, the solvent or reagent, according to the counter-current principle.

According to the modification illustrated in Fig. 2 each space D is supplied with a mixture of solvent and solution through a double jet having two concentric orifices: the inner jet serves for the admission of the solution, which is sent to it from one compartment by a scoop-pipe *f*, and the outer jet *c'*, serves for the admission of the solvent, which is sent to it from the next compartment through a scoop-pipe *c''*

I claim:

1. An apparatus for removing at least one of the constituents from a liquid mixture by centrifugation of the mixture and scooping the separate liquid layers, comprising a drum rotatively mounted and laterally bounded by two annular discs, arranged for forming with the drum an inner annular compartment, means for causing this drum to rotate at a high speed, two annular discs secured within this drum and arranged for dividing said annular compartment into a lateral space of great width, a narrow intermediate space and a narrow lateral space, the disc limiting the narrow lateral space extending outwardly to a small distance from the periphery of the drum, and the disc separating the intermediate space from the space of great width extending outwardly to a greater distance from the periphery of said drum, a fixed nozzle opening at the inner periphery of said drum, in the intermediate space and directed towards the annular disc separating this space from the space of great width, a supply piping opening in this nozzle and adapted to lead from the exterior the mixture of liquids to be treated, a supply piping also opening in this nozzle and adapted to convey the solvent in the latter, a scoop-pipe extending from the lateral space of great width and adapted to evacuate the solvent laden with the constituent to be removed from the mixture, and a scoop-pipe extending from the narrow lateral space and adapted to evacuate the treated and exhausted mixture.

2. An apparatus for removing at least one of the constituents from a liquid mixture as claimed in claim 1, in which the inner peripheral portion of the disc separating the intermediate space from the space of great width, has a portion in the shape of a conical surface.

3. An apparatus for removing at least one of the constituents from a liquid mixture, as claimed in claim 1, in which the outlet orifice of said nozzle opens against the portion in the shape of a conical surface separating the intermediate space from the space of great width, said orifice being very close to said conical surface.

4. An apparatus for removing at least one of the constituents from a liquid mixture, as claimed in claim 1, in which the end of the scoop-pipe extending from the lateral space of great width and the end of the scoop-pipe extending from the narrow lateral space, are directed in a direction reverse to the direction of rotation of the drum.

5. An apparatus operating on the counter-current principle for removing at least one of the constituents from a liquid mixture as claimed in claim 1, in which the drum is internally divided into a series of annular compartments, each of which is divided into a lateral space of great width, a narrow intermediate space and a narrow lateral space, and has a nozzle within each intermediate space, the piping adapted to convey the mixture of liquids to be treated opening in the last nozzle at one of the ends of the drum, the piping adapted to convey the solvent opening in the last nozzle at the other end of the drum, the narrow lateral space of each compartment being connected to the nozzle of the following compartment, relatively to the direction of circulation of the mixture being treated, by a scoop-pipe, and the space of great width of each compartment being connected to the nozzle of the following compartment, relatively to the direction of circulation of the solvent, by another scoop-pipe.

6. A method for extracting a body from a complex liquid mixture by means of an auxiliary body acting as solvent or reagent on said body to be extracted, this auxiliary body being liquid and nonmiscible with the liquid mixture to be treated, said method consisting in introducing together the liquid mixture to be treated and the auxiliary body into a rotary vessel where they come in intimate contact, then separate in the form of concentric layers under the influence of centrifugal force, one of the layers being especially constituted by the auxiliary body and that of the liquid bodies it has dissolved, and the other layer being especially constituted by the impoverished liquid mixture, and in continuously extracting from each of these layers the portion situated nearest the axis of rotation by a scooping operation.

7. A method for extracting a body from a complex liquid mixture by means of an auxiliary body acting as solvent or reagent on said body to be extracted, this auxiliary body being liquid and nonmiscible with the liquid mixture to be treated, said method consisting in introducing together the liquid mixture to be treated and the auxiliary body into a rotary chamber where they come in intimate contact, then separate in the form of concentric layers under the influence of centrifugal force, one of the layers being especially constituted by the auxiliary body and that of the liquid bodies it has dissolved, and the other layer being especially constituted by the impoverished liquid mixture, in continuously extracting from each of these layers the portion situated nearest the axis of rotation by a scooping operation, and in discharging the liquids thus extracted respectively in two other rotary chambers where they again separate in the form of concentric layers and so on, so that the solution circulates in one direction and is consequently enriched with the body to be extracted, and the impoverished liquid mixture insoluble in the auxiliary body circulates in the reverse direction and is consequently purified, the evacuation and transfer of the liquids from one chamber to another being always produced by scooping out from portions of said liquid layers situated the nearest to the axis of rotation.

8. In a process of treating one liquid substance with another liquid substance of different density containing a solvent or reagent for a part of the first liquid substance, the steps of centrifugally stratifying said liquid substances in concentric layers about an axis, causing said layers while subject to centrifugal force to flow beside one another in a direction transverse to said axis against the action of centrifugal force in separated, non-contacting portions each having its surface nearest said axis free and substantially parallel to the axis, and continuously scooping both liquid substances by their force of rotation from said separated portions.

9. In a process of treating one liquid substance with another liquid substance of different density containing a solvent or reagent for a part of the first liquid substance, the steps of centrifugally stratifying said liquid substances in concentric layers about an axis, causing said layers while subject to centrifugal force to flow beside one another in a direction transverse to said axis against the action of centrifugal force in separated, non-contacting portions each having its surface nearest said axis free and substantially parallel to the axis, continuously scooping both liquid substances by their force of rotation from said separated portions, and repeatedly subjecting said scooped layers in counter-current with one another after commingling them with one another to such centrifugal and scooping operations.

10. In a process of treating one liquid substance with another liquid substance of different density containing a solvent or reagent for a part of the first liquid substance, the steps of causing a continuous flow of said liquids in counter-current to one another through a centrifugal machine having several annular compartments, in each compartment centrifugally stratifying said liquid substances in concentric layers about an axis, causing said layers while subject to centrifugal force to flow beside one another in a direction transverse to said axis against the action of centrifugal force in separate, non-contacting portions each having its surface nearest said axis free and substantially parallel to the axis, continuously scooping both liquid substances by their force of rotation from the free surfaces thereof in each compartment, and repeatedly leading said scooped layers in counter-current to one another from compartment to compartment by their force of rotation.

11. In a process of treating one liquid substance with another liquid substance of different density containing a solvent or reagent for a part of the first liquid substance, the steps of causing a continuous flow of said liquids in counter-current to one another through a centrifugal machine having several annular compartments, in each compartment centrifugally stratifying said liquid substances in concentric layers about an axis, causing said layers while subject to centrifugal force to flow beside one another in a direction transverse to said axis against the action of centrifugal force in separate, non-contacting portions each having its surface nearest said axis free and substantially parallel to the axis, continuously scooping both liquid substances by their force of rotation from the free surfaces thereof in each compartment, repeatedly leading said scooped layers in counter-current to one another from compartment to compartment by their force of rotation, and finally scooping one repeatedly treated liquid from the first compartment and the other repeatedly treated liquid from the last compartment.

12. In a process of treating liquid hydrocarbons with acids, the steps of causing a continuous flow of said hydrocarbons and acids in counter-current to another through a centrifugal machine having several annular compartments, in each compartment centrifugally stratifying said hydrocarbons and acids in concentric layers about an axis, causing said layers while subject to centrifugal force to flow beside one another in a direction transverse to said axis against the action of centrifugal force in separated, non-contacting portions each having its surface nearest said axis free and substantially parallel to the axis, continuously scooping said hydrocarbons and acids by their force of rotation from said separated portions, and repeatedly leading said scooped hydrocarbons and acids in counter-current to one another from compartment to compartment by their force of rotation.

13. In a process of treating liquid hydrocarbons with alkalies, the steps of causing a continuous flow of said hydrocarbons and alkalies in counter-current to one another through a centrifugal machine having several annular compartments, in each compartment centrifugally stratifying said hydrocarbons and alkalies in concentric layers about an axis, causing said layers while subject to centrifugal force to flow beside one another in a direction transverse to said axis against the action of centrifugal force in separated, non-contacting portions each having its surface nearest said axis free and substantially parallel to the axis, continuously scooping said hydrocarbons and alkalies by their force of rotation from said separated portions, and repeatedly leading said scooped hydrocarbons and alkalies in counter-current to one another from compartment to compartment by their force of rotation.

14. In a process of treating one liquid substance with another liquid substance of different density containing a solvent or reagent for a part of the first liquid substance, the steps of centrifugally stratifying said liquid substances about an axis in concentric layers separated by an intermingled layer, continuously leading further liquid substances into the intermingled layer between said concentric layers, and causing said separated layers while subject to centrifugal force by their difference in specific gravity to flow separated by walls beside one another in a direction transverse to said axis, each separated layer having its surface nearest said axis free and substantially parallel to said axis, and continuously scooping each separated layer by its force of rotation.

15. In a centrifugal separator, a compartment mounted to rotate about an axis and having its portion remote from the axis closed, a partition in said compartment transverse to said axis dividing the compartment into two sections and providing a passage between said sections adjacent the outside of the compartment, and means to feed a mixture of liquids into one of said sections at a point closer to the axis than said passage but further from the axis than the inner edge of said partition, and means to scoop liquid from each of said sections in the portion adjacent said axis.

16. In a centrifugal separator, a compartment mounted to rotate about an axis and having its portion remote from the axis closed, a pair of partitions in said compartment dividing the same into sections and extending transversely to the said axis, the first of said partitions providing a passage between two of said sections adjacent the outside of the compartment, the second partition terminating closer to the axis of the shaft than the innermost point of said passage, means to feed a mixture of liquids to the section between said partitions, and means to scoop liquid from each of the outer sections in the portion adjacent said axis.

17. In a centrifugal separator, a compartment mounted to rotate about an axis and having its portion remote from the axis closed, a pair of partitions in said compartment dividing the same into sections and extending transversely to the said axis, the first of said partitions providing a passage between two of said sections adjacent the outside of the compartment, the second partition terminating closer to the axis of the shaft than the innermost point of said passage, means to feed a mixture of liquids to a section on one side of said second partition, and means to scoop liquid from each of the other two sections in the portion adjacent said axis.

18. A centrifugal separator comprising a series of compartments mounted side by side for rotation about an axis, each compartment having its portion remote from the axis closed, a partition in said compartment transverse to said axis dividing the compartment into two sections and providing a passage between said sections adjacent the outside of the compartment, means to scoop liquid from each of said sections in the portion adjacent said axis, means to mix the liquid scooped from the second section of each compartment except the last of the series with the liquid scooped from the first compartment of the second succeeding compartment of the series, means for mixing the liquid scooped from the second section of the next to last compartment and from the first section of the second compartment of the series with fresh liquid, means for introducing such mixed liquids into the intermediate sections at points closer to the axis than said passages but further from the axis than the inner edges of said partitions, and means to remove liquids scooped from the first section of the first compartment and the second section of the last compartment.

CHARLES COUTOR.